United States Patent
Meirav et al.

(10) Patent No.: US 9,987,584 B2
(45) Date of Patent: Jun. 5, 2018

(54) METHOD AND SYSTEM FOR REDUCTION OF UNWANTED GASES IN INDOOR AIR

(71) Applicant: ENVERID SYSTEMS, INC., Newton, MA (US)

(72) Inventors: Udi Meirav, Newton, MA (US); Israel Biran, Avihayil (IL); Abraham Bechar, Tel-aviv (IL)

(73) Assignee: ENVERID SYSTEMS, INC., Needham, MA (US)

( * ) Notice: Subject to any disclaimer, the term of this patent is extended or adjusted under 35 U.S.C. 154(b) by 381 days.

(21) Appl. No.: 14/443,052

(22) PCT Filed: Nov. 15, 2013

(86) PCT No.: PCT/US2013/070383
§ 371 (c)(1),
(2) Date: May 14, 2015

(87) PCT Pub. No.: WO2014/078708
PCT Pub. Date: May 22, 2014

(65) Prior Publication Data
US 2015/0298043 A1    Oct. 22, 2015

Related U.S. Application Data

(60) Provisional application No. 61/727,022, filed on Nov. 15, 2012.

(51) Int. Cl.
*B01D 53/02* (2006.01)
*B01D 53/04* (2006.01)

(52) U.S. Cl.
CPC ......... *B01D 53/04* (2013.01); *B01D 53/0454* (2013.01); *B01D 2253/102* (2013.01);
(Continued)

(58) Field of Classification Search
CPC ........ B01D 2253/102; B01D 2253/104; B01D 2253/106; B01D 2253/116; B01D 2253/20; B01D 2253/202; B01D 2253/204; B01D 2257/302; B01D 2257/404; B01D 2257/502; B01D 2257/504; B01D 2257/708; B01D 2257/93;
(Continued)

(56) References Cited

U.S. PATENT DOCUMENTS

| | | |
|---|---|---|
| 2009/0220388 A1 | 9/2009 | Monzyk et al. |
| 2011/0265648 A1 | 11/2011 | Meirav |
| 2012/0012005 A1 | 1/2012 | Burke |

*Primary Examiner* — Christopher P Jones
(74) *Attorney, Agent, or Firm* — Cooley LLP

(57) ABSTRACT

An air treatment system for at least partially removing at least one gaseous contaminant contained in indoor air of a room structured for human occupants. The system may comprise an air treatment assembly having an indoor air inlet configured to receive indoor airflow directly from a room, a regenerable adsorbent material configured to adsorb at least one gaseous contaminant contained in the indoor airflow, at least one airflow element for directing the indoor airflow to flow through the air treatment assembly, an indoor air outlet for expelling the indoor air, from the air treatment assembly back into the room, a purge air inlet configured to receive and direct purge air over and/or through the adsorbent material for removal of at least a portion of the at least one gaseous contaminant, and a purge air outlet for expelling the purge air out of the air treatment assembly.

20 Claims, 13 Drawing Sheets

(52) U.S. Cl.
CPC .. *B01D 2253/104* (2013.01); *B01D 2253/106* (2013.01); *B01D 2253/116* (2013.01); *B01D 2253/20* (2013.01); *B01D 2253/202* (2013.01); *B01D 2253/204* (2013.01); *B01D 2257/302* (2013.01); *B01D 2257/404* (2013.01); *B01D 2257/502* (2013.01); *B01D 2257/504* (2013.01); *B01D 2257/708* (2013.01); *B01D 2257/93* (2013.01); *B01D 2259/4009* (2013.01); *B01D 2259/40086* (2013.01); *B01D 2259/4145* (2013.01); *B01D 2259/455* (2013.01); *B01D 2259/4508* (2013.01); *B01D 2259/4541* (2013.01); *Y02C 10/08* (2013.01)

(58) Field of Classification Search
CPC .. B01D 2259/40086; B01D 2259/4009; B01D 2259/4145; B01D 2259/4508; B01D 2259/4541; B01D 2259/455; B01D 53/04; B01D 53/0454; Y02C 10/08
See application file for complete search history.

METHOD AND SYSTEM FOR REDUCTION OF UNWANTED GASES IN INDOOR AIR

This application is a 35 U.S.C. § 371 national stage entry of PCT/US2013/070383, which claims priority to U.S. Provisional Patent Application No. 61/727,022, filed Nov. 15, 2012, entitled "Method and System for to Reduction of Substances in Indoor Air", the disclosure of which is incorporated herein by reference in its entirety.

TECHNICAL FIELD

Embodiments of the present disclosure generally relate to apparatuses, systems and methods for reducing unwanted gases from indoor air.

BACKGROUND

Indoor air within and around enclosed environments, such as buildings, vehicles and structures, is affected by a plurality of substances comprising contaminants. Among these contaminants, often with the highest concentration, is carbon dioxide ($CO_2$). There are other contaminants which may appear in relatively lower concentrations yet are no less important to monitor and/or reduce. A class of such contaminants is a group of species of organic vapors, broadly referred to as Volatile Organic Compounds (VOC). Contaminate gases (e.g., $CO_2$) and VOCs, and corresponding vapors thereof, may collectively be referred to as a "gas(es)". The sources of these contaminants include, inter alia, the human occupants themselves—from respiration and perspiration to clothing and cosmetics—as well as building materials, equipment, food and consumer products, cleaning materials, office supplies or any other materials which emit VOCs. Other classes of contaminants are inorganic compounds and microorganisms such as bacteria, viruses, mold, fungi and airborne particles. Additional gaseous contaminants may be sulfur oxides, nitrous oxides, radon, or carbon monoxide.

SUMMARY OF DISCLOSURE

According to some embodiments of the present disclosure, systems and methods are described for maintaining good air quality in an enclosed environment. According to some embodiments, the good air quality may be maintained by an air treatment system configured for maintaining at least one gaseous contaminant concentration contained in indoor air of the enclosed environment below a predetermined gaseous contaminant concentration.

According to some embodiments of the present disclosure, there is described an air treatment system for at least partially removing at least one gaseous contaminant contained and/or unwanted gases in indoor air of a room structured for human occupants. The system may comprise an air treatment assembly having an indoor air inlet configured to receive indoor airflow directly from a room, the indoor air inlet may be placed within the room, a regenerable adsorbent material configured to adsorb at least one gaseous contaminant contained in the indoor airflow, at least one airflow element for directing the indoor airflow to flow through the air treatment assembly, an indoor air outlet for expelling the indoor air, treated by the adsorbent material, from the air treatment assembly back into the room, the indoor air outlet may be placed within the room, a purge air inlet configured to receive and direct purge air over and/or through the adsorbent material for removal of at least a portion of the at least one gaseous contaminant adsorbed by the adsorbent material, and a purge air outlet for expelling the purge air out of the air treatment assembly, the air treatment system may be configured to operate cyclically in at least in two modes, including an adsorption mode to adsorb the at least one gaseous contaminant by the adsorbent material, and a regeneration mode to regenerate the adsorbent material by the removal of at least a portion of the at least one gaseous contaminant adsorbed by the adsorbent material, and a controller system for controlling at least the cyclic operation of the adsorption mode and the regeneration mode by controlling the airflow element.

According to some embodiments, the system may further comprise one or more sensors for measuring the concentration of the at least one gaseous contaminant and/or detecting the presence of the at least one gaseous contaminant, wherein the one or more sensors may be configured to generate a signal corresponding to a concentration of the at least one gaseous contaminant and/or the presence of the at least one gaseous contaminant, and transmit the signal to the controller system.

According to some embodiments, the airflow element may comprise at least one of a fan, a blower, a damper, and a shutter. According to some embodiments, the air treatment assembly may be configured as a portable unit. According to some embodiments, the air treatment assembly may include one or more wheels and/or castors for transporting the air treatment assembly. According to some embodiments, the air treatment assembly may be configured for installation in a window or an exterior wall of the room. According to some embodiments, the air treatment assembly may be configured for placement on or proximate the floor of the room.

According to some embodiments, the system may further comprise one or more flexible and/or collapsible conduits configured to direct purge air to the air treatment assembly to flow over and/or through the adsorbent material and/or expel the purge air from the air treatment assembly via the purge air outlet to outside the room. According to some embodiments, the purge air may be directly or indirectly heated by at least one of, a heat pump, a furnace, solar heat, an electrical coil, and hot water. According to some embodiments, the at least one gaseous contaminant may be selected from the group consisting of: carbon dioxide, volatile organic compounds, sulfur oxides, radon, nitrous oxides and carbon monoxide. According to some embodiments, the adsorbent material comprises at least one of: activated carbon, carbon particles, solid supported amine, molecular sieves, porous silica, porous alumina, carbon fibers, metal organic frameworks, porous polymers and polymer fibers.

According to some embodiments, the system may further comprise at least one cartridge wherein the adsorbent material is arranged therein, wherein the air treatment assembly is configured to access the cartridge while the air treatment assembly remains stationary. According to some embodiments, the room is in a building and the purge air may comprise outdoor air from out of the building and the purge air inlet may be placed out of the building with access to the purge air. According to some embodiments, the removal of the at least one gaseous contaminant adsorbed by the adsorbent material regenerates the adsorbent material and is performed in-situ the adsorbent material without removing the adsorbent material from the air treatment system.

According to some embodiments of the present disclosure, there is described an air treatment system for at least partially removing at least one gaseous contaminant contained in indoor air of an enclosed environment, the system comprising an air treatment assembly having an indoor air inlet configured to receive indoor airflow from the enclosed environment, a regenerable adsorbent material configured to adsorb at least one gaseous contaminant contained in the indoor airflow, at least one airflow element for directing the indoor airflow to flow through the air treatment assembly, an indoor air outlet for expelling the indoor airflow, treated by the adsorbent material, from the air treatment assembly back into the enclosed environment, a purge air inlet configured to receive and direct purge air over and/or through the adsorbent material for removal of at least a portion of the at least one gaseous contaminant adsorbed by the adsorbent material, a purge air outlet for expelling the purge air out of the air treatment assembly, the air treatment system may be configured to operate cyclically in at least two modes, an adsorption mode to adsorb the at least one gaseous contaminant by the adsorbent material, and a regeneration mode to regenerate the adsorbent material by the removal of at least a portion of the at least one gaseous contaminant adsorbed by the adsorbent material, and a controller system for controlling at least the cyclic operation of the adsorption mode and the regeneration mode cycle by controlling the at least one airflow element, wherein the air treatment assembly may be configured to remove at least the portion of the at least one gaseous contaminant from the enclosed environment.

In some embodiments, the enclosed environment may lack a controlled supply of outdoor air ventilation.

According to some embodiments of the present disclosure, there is described a method for at least partially removing at least one gaseous contaminant contained in indoor air of an enclosed environment, the method may comprise receiving indoor airflow from an enclosed environment through an indoor air inlet, directing the indoor airflow by at least one airflow element to flow through a regenerable adsorbent material, adsorbing, during an adsorption mode, at least one gaseous contaminant contained in the indoor airflow by the regenerable adsorbent material, expelling the indoor airflow, treated by the adsorbent material back into the enclosed environment, receiving and directing, during a regeneration mode, purge air over and/or through the adsorbent material for removal of at least a portion of the at least one gaseous contaminant adsorbed by the adsorbent material, expelling the purge air out of the adsorbent material, and controlling at least an operation of the adsorption mode and the regeneration mode by controlling at least one airflow element.

According to some embodiments of the present disclosure, there is described an air treatment system for limiting the concentration of at least one gaseous contaminant contained in indoor air of an enclosed environment, below a predetermined concentration. The system may comprise an air treatment assembly having an indoor air inlet configured to receive at least a portion of an indoor airflow from an enclosed environment, a regenerable adsorbent material configured to adsorb at least one gaseous contaminant contained in the portion of the indoor airflow, an airflow element for directing the portion of the indoor airflow from the enclosed environment to the air treatment assembly, an indoor air outlet for expelling the portion of indoor airflow treated by the adsorbent material from the air treatment assembly for flow back into the enclosed environment, a purge air inlet configured to receive and direct purge air over and/or through the adsorbent material for removal of at least a portion of the at least one gaseous contaminant adsorbed by the adsorbent material, and a purge air outlet for expelling the purge air out of the air treatment assembly. The air treatment assembly may be configured to limit the gaseous contaminant concentration of the indoor air below a predetermined concentration according to any and all of the following configurations: upon outdoor air ventilation of the enclosed environment being insufficient for maintaining the least one gaseous contaminant concentration below the predetermined concentration, the indoor air being conditioned by an air conditioning system independent from the air treatment assembly, the conditioning comprising changing at least one of the temperature and humidity of the indoor air, the air conditioning system comprising components for circulating the indoor air, or the indoor air is not conditioned by an air conditioning system.

In some embodiments, the gaseous contaminant may be carbon dioxide and the predetermined concentration contained in indoor air is about 2000 ppm. In some embodiments, the gaseous contaminant may be carbon dioxide and the insufficiency of outdoor air ventilation may occur upon the enclosed environment containing a human density effecting a carbon dioxide concentration in the indoor air above about 2000 ppm.

BRIEF DESCRIPTION OF THE DRAWINGS

The principals and operations of the systems, apparatuses and methods according to some embodiments of the present disclosure may be better understood with reference to the drawings, and the following description. These drawings are given for illustrative purposes only and are not meant to be limiting.

DETAILED DESCRIPTION

Figure 1A:
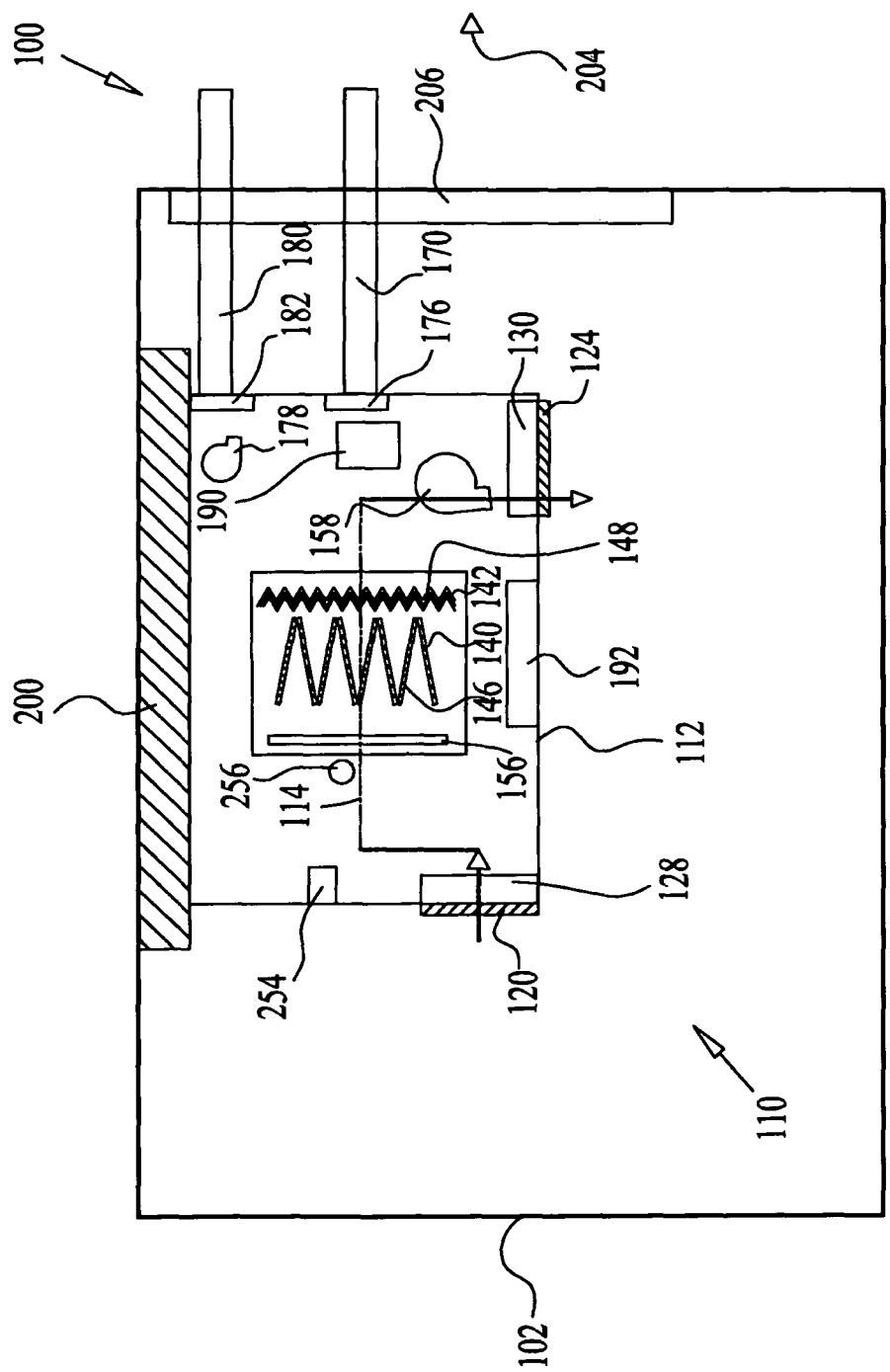
FIGS. 1A and 1B are simplified schematic illustrations of a system for reducing unwanted gases in indoor air at a first operational mode (FIG. 1A) and a second operational mode (FIG. 1B) according to some embodiments of the present disclosure.
Figure 1B:
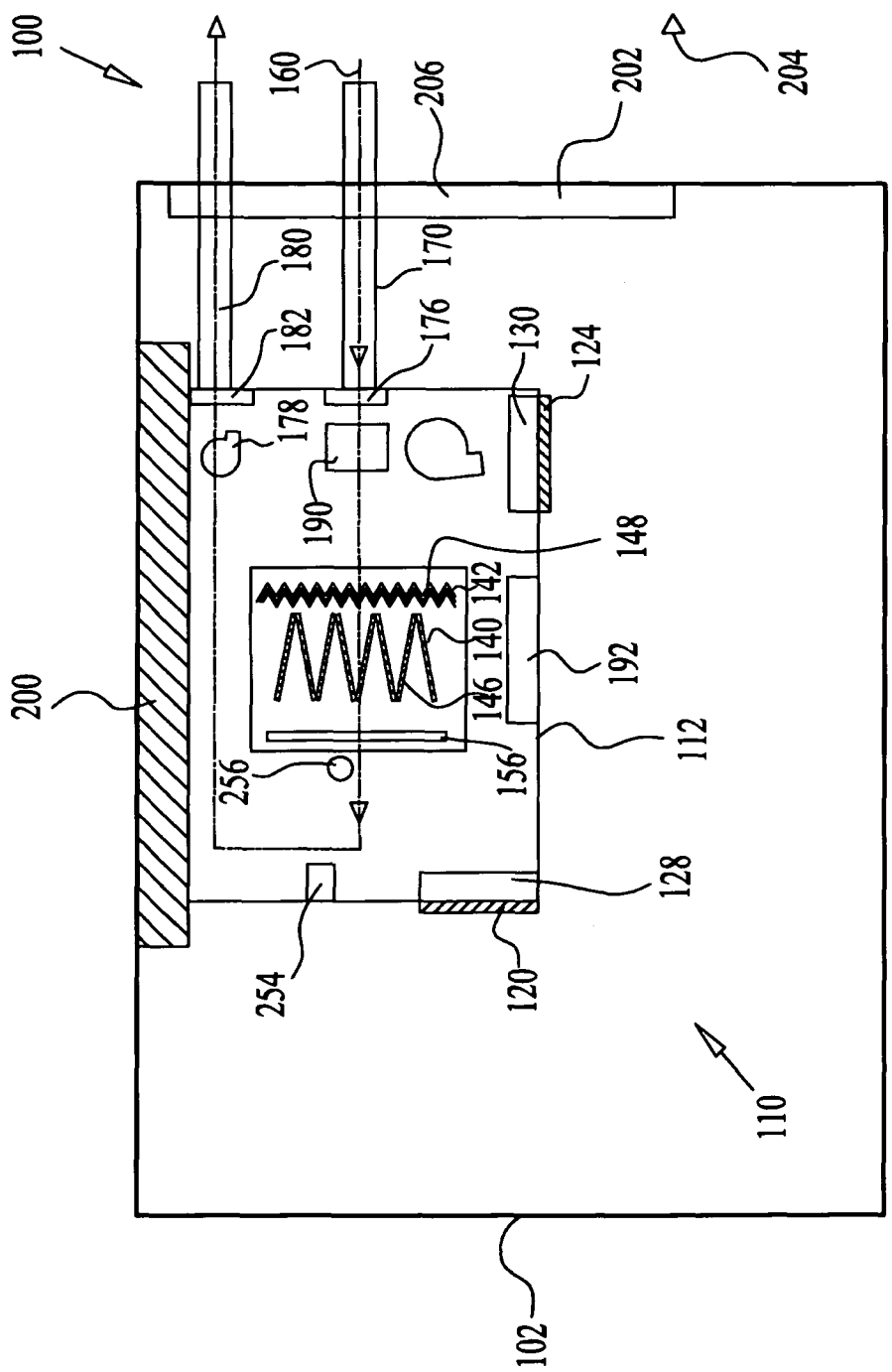

FIGS. 1A and 1B are simplified schematic illustrations of a system 100 for reducing unwanted gases in indoor air of an enclosed environment 102 at a first operational mode and a second operational mode according to some embodiments of the present disclosure, respectively.

The enclosed environment 102 may comprise a commercial environment or building; an office building; a residential environment or building; a house; a school; a factory; a hospital; a store; a mall; an indoor entertainment venue; a storage facility; a laboratory; a vehicle; a vessel including an aircraft, a ship, a sea vessel or the cabin of a sea vessel; a bus; a theatre; a partially and/or fully enclosed arena; a tent; an education facility; a library; and/or other partially and/or fully enclosed structure and/or facility which can be at times occupied by equipment, materials, live occupants (e.g., humans, animals, synthetic organisms, etc.), etc., and/or any combination thereof.

According to some embodiments, the enclosed environment 102 may comprise a plurality of indoor spaces such as rooms, cubicles, zones in a building, compartments, railroad cars, caravans or trailers, for example, and may be referred to as "indoor spaces".

In some embodiments of the present disclosure, an air treatment assembly 110 may be provided to reduce the concentration of contaminants contained in the airflow introduced therein, thereby removing from the enclosed environment 102 the unwanted gases containing the contaminants. The airflow may be indoor air 114 from the enclosed environment 102.

The air treatment assembly 110 may comprise a housing 112. The indoor air 114 may flow into the housing 112 of the air treatment assembly 110, via an indoor air inlet 120 and may exit the air treatment assembly 110 following treatment therein, via an indoor air outlet 124. An indoor air inlet damper 128 may be provided to control the volume of incoming indoor air 114. An indoor air outlet damper 130 may be provided to control the volume of the treated indoor airflow, expelled from the air treatment assembly 110, into the enclosed environment 102.

Within housing 112 there may be provided a $CO_2$ sorbent section 140 configured to scrub $CO_2$ from the indoor air 114 and/or a VOC sorbent section 142 configured to scrub VOCs from the indoor air 114. The sorbents including adsorbent materials may also be considered and referred to as scrubbers. Examples of adsorbent material based scrubbers are disclosed in applicant's U.S. Pat. Nos. 8,157,892 and 8,491,710, which are incorporated herein by reference in their entireties. The scrubbers may comprise any suitable material for capturing undesired contaminants from the indoor air 114 flowing therein. For example, the scrubber may comprise an adsorbent material including a solid support, supporting an amine-based compound, such as disclosed in applicant's PCT application PCT/US12/38343, which is incorporated herein by reference in its entirety.

Adsorbent materials may also include, but are not limited to, clays, molecular sieves, zeolites, various forms of silica and alumina, porous silica, porous alumina, various forms of carbon, activated carbon, carbon fibers, carbon particles, titanium oxide, porous polymers, polymer fibers and metal organic frameworks.

Adsorbent materials selective to VOCs may also include, but are not limited to molecular sieves, activated carbon, zeolites, carbon fibers and carbon particles, for example.

In some embodiments more than one type of adsorbent material is used.

The $CO_2$ adsorbent section 140 may include a plurality of $CO_2$ scrubbing cartridges 146 arranged in any suitable arrangement. For example, the $CO_2$ scrubbing cartridges 146 may be arranges as parallel plates and/or arranged in a staggered, v-bank formation. This staggered arrangement allows substantially parallel airflow paths of the indoor air 114 through the plurality of the $CO_2$ scrubbing cartridges 146.

The VOC sorbent section 142 may include one or more VOC scrubbing cartridges 148 arranged in any suitable arrangement. For example, the VOC scrubbing cartridges 148 may be arranges as parallel plates and/or arranged in a staggered, v-bank formation. This staggered arrangement allows substantially parallel airflow paths of the indoor air 114 through the plurality of the VOC scrubbing cartridges 148. In some embodiments the VOC scrubbing cartridge 148 has a pleated or otherwise folded configuration to increase the surface area thereof.

Exemplary scrubbing cartridges and modules are disclosed in applicant's US Patent Publication No. 20110198055, which is incorporated herein by reference in its entirety.

Additional air treatment functionalities may be employed for removing other contaminates from the indoor air 114, shown in a dashed line. In some embodiments, the air treatment assembly 110 may comprise any thin permeable sheet structure, carbon fibers and/or particles attached to a sheet of some other permeable material such as paper, cloth or fine mesh, for example, and shown as a filter 156.

In some embodiments, the air treatment assembly 110 may include catalysts that cause change or decomposition of certain molecules, such as, for example, VOCs or ozone. Such catalysts may include, but are not limited to, any of a number of metal oxides or porous heavy metals. In some embodiments, the air treatment assembly 110 may include plasma or ionizers that generate ions, which in turn can serve to eliminate VOCs or microorganisms. Similarly, ultraviolet radiation can be employed to destroy microorganisms or activate certain catalytic processes.

Operation of the air treatment assembly 110 may comprise an adsorption cycle, i.e. an adsorption mode (also known as a scrub cycle), as shown in FIG. 1A, and a regeneration mode (also known as a purge cycle or purge mode), as shown in FIG. 1B. The operation of the air treatment assembly 110 may be cyclic by alternating between the adsorption mode, the regeneration mode and/or any other mode, repeatedly.

In some embodiments, the air treatment assembly 110 may be configured to adsorb the contaminants during the adsorption cycle and the adsorbent material may be regenerated during the regeneration cycle. The air treatment assembly 110 may be configured to repeatedly alternate at least between the adsorption cycle and the regeneration cycle.

During the scrub cycle (FIG. 1A), the contaminants are captured and adsorbed by the adsorbent material or any other means. A portion of the indoor air 114, may be urged by an airflow element provided for directing the indoor air to flow into the air treatment assembly 110. The airflow element may comprise, for example, a fan 158 or a blower. The indoor air 114 may flow into the air treatment assembly 110, via indoor air inlet 120 and air inlet damper 128, when positioned at least partially in an open state. The indoor air inlet 120 may be formed with a grille.

The fan 158 may be placed in any suitable location within the housing 112, such as upstream in a "push" mode, i.e. intermediate the indoor air inlet 120 and $CO_2$ adsorbent section 140. Alternatively, as seen in FIG. 1A, the fan 158 may be placed downstream in a "pull" mode i.e. after the $CO_2$ adsorbent section 140.

The rate and/or volume of the indoor air 114 flowing into the air treatment assembly 110 may be controlled by the fan 140 and/or air inlet damper 128, or by any other suitable means.

In some embodiments a portion of a volume of the indoor air 114 may be directed into the air treatment assembly 110 for treatment thereof. The volume of the indoor air 114 may comprise a reference volume which may include the overall volume of the indoor air within the enclosed environment 102 or the indoor spaces therein. In a non-limiting example, when the enclosed environment 102 is a room (e.g. a classroom, a lecture hall), the reference air volume is the overall volume of the indoor air within the room.

In some embodiments, about 1%-50% of the indoor air reference volume may be directed into the air treatment assembly 110 during a predetermined time period (e.g. an hour, day etc.). In some embodiments, about 1%-25% of the indoor air reference volume may enter the air treatment assembly 110 during a predetermined time period. In some embodiments, about 1%-10% of the indoor air reference volume may enter the air treatment assembly 110 during a predetermined time period.

The indoor air 114 may flow through the filter 156, $CO_2$ adsorbent section 140 and/or the VOC adsorbent section 142. The now scrubbed air may flow out of the air treatment assembly 110 via the indoor air outlet 124 and indoor air outlet damper 130, when positioned, at least partially, in an open state. The indoor air outlet 124 may be formed with a grille.

The treated air exiting the air treatment assembly 110 may be expelled into the enclosed environment 102.

According to some embodiments of the present disclosure, the air treatment assembly 110 may be configured to operate independently, i.e. without association with an air management system or disconnectedly from an air management system. An air management system may comprise a system which circulates indoor air and conditions indoor air. Conditioning indoor air may comprise changing the temperature and/or humidity of the indoor air. The air management system may comprise an air conditioning system, such as a Heating, Ventilation and Air-Conditioning ("HVAC") system which may include a centralized air conditioning system, a fan-coil system, and/or a unit-ventilator system. The centralized air conditioning system generally includes ductwork for flow of the indoor air therein to an air handling unit which conditions the air therein. The conditioned air flows out of the air handling unit to the enclosed environment, thereby circulating the indoor air. The fan-coil system generally includes a fan-coil unit comprising a fan for drawing the indoor air and heating and cooling coils for conditioning the air and returning the conditioned air to the enclosed environment, thereby circulating the indoor air. The air conditioning system may also comprise fresh air ducts for introducing fresh, unconditioned air into the enclosed environment. The air conditioning system may also comprise air exhaust ducts for exhausting air out of the enclosed environment for maintaining the pressure equilibrium within the enclosed environment.

According to some embodiments, the air treatment assembly 110 of the present disclosure is configured to direct the indoor air therein without being dependent on the ducts and/or fans of the air management system. Thus the air treatment assembly 110 may operate in an enclosed environment that is not equipped with an air management system. The air treatment assembly 110 may also operate in an enclosed environment that is equipped with an air management system, yet the air treatment assembly 110 operates independently and discontentedly from the air management system.

The air treatment assembly 110 is formed with its fan, such as fan 158 and its inlets and outlets, such as indoor air inlet 120 and indoor air outlet 124 for operation thereof independently of an air management system. In some embodiments, the air treatment assembly 110 comprises its controller 254 for controlling the operation of the air treatment assembly 110, as will be further described.

Treating the indoor air 114 within the air treatment assembly 110 by scrubbing the contaminants therefrom may be greatly advantageous for maintaining good air quality.

In some embodiments, good air quality may include air with a $CO_2$ concentration of less than 2500 ppm. In some embodiments, good air quality may include air with a $CO_2$ concentration of less than 2000 ppm. In some embodiments, good air quality may include air with a $CO_2$ concentration of less than 1500 ppm. In some embodiments, good air quality may include air with a $CO_2$ concentration of less than 1000 ppm.

Following the capture and scrubbing of the contaminants in the adsorption cycle, the adsorbent material may be regenerated during the regeneration cycle by urging the release of the contaminants from the adsorbent material.

The regeneration may be performed in any suitable manner. For example, in some embodiments, regeneration may be performed by streaming a purge gas 160 (FIG. 1B) over and/or through the adsorbent material for release of at least a portion of the contaminants therefrom. In some embodiments, the purge gas 160 may be exhausted out of the enclosed environment 102. During the regeneration cycle, the purge gas 160 may flow into the air treatment assembly 110, via a purge gas inlet 170, such as a purge air inlet. The purge gas inlet 170 may be associated with a purge gas inlet damper 176. The purge gas 160 may flow into the air treatment assembly 110 when the damper 176 is positioned, at least partially, in an open state, while the air inlet damper 128 and air outlet damper 130 may be closed. An additional fan 178 may be provided for urging flow of the purge gas 160 into the air treatment assembly 110. The fan 178 may be placed in any suitable location, such as in proximity to a purge gas exhaust 180. Alternatively, the fan 178 may be omitted, such as when fan 158 may be used for directing the purge gas 160 into the air treatment assembly 110. The purge gas 160 may exit from the air treatment assembly 110, via purge gas exhaust 180 and a purge gas exhaust damper 182. The purge gas exhaust 180 may comprise a purge air outlet for expelling the purge gas 160 out of the air treatment assembly.

Purge gas inlet damper 176 may be provided to control the volume of the purge gas 160 entering the air treatment assembly 110 and purge gas exhaust damper 182 may be provided to control the volume of the purge gas 160 exiting therefrom.

Thus, in some embodiments, it is seen that switching the air treatment assembly 110 operation from the adsorption cycle to the regeneration cycle may be performed by the dampers and/or fans or any other suitable means.

In accordance with some embodiments the purge gas 160 comprises purge air.

The purge air may be provided to the air treatment assembly 110 from any source of air, such as outdoor air. For example, the source of outdoor air may be ambient air flowing directly from the outdoor ambient, i.e. outside the enclosed environment 102, into the air treatment assembly 110, as shown in FIGS. 1A-5B. Alternatively, the outdoor air may flow from the ambient environment into the air treatment assembly 110 via ducts (not shown). Additionally, the source of outdoor air may be from other locations in the enclosed environment 102, such as from an enclosed environment pier.

In some embodiments, in-situ regeneration, namely without having to move the adsorbent material out of the air treatment assembly 110, or parts of the air treatment assembly 110, can be facilitated by a combination of heat and a flow of a purge gas 160, which may be outdoor air, for example. In a non-limiting example, the outdoor air contains a $CO_2$ concentration of less than 1000 ppm. In a non-limiting example, the outdoor air contains a $CO_2$ concentration of less than 600 ppm. In a non-limiting example, the outdoor air contains a $CO_2$ concentration of less than 400 ppm.

In some embodiments, the purge gas 160 may flow during the regeneration cycle in the opposite direction of the indoor air flow during the adsorption cycle, such as from purge gas inlet 170 to the purge gas exhaust 180, such as shown in FIGS. 1A-8. Alternatively, the purge gas 160 may flow during the regeneration cycle in the same direction of the return airflow, such as from purge gas exhaust 180 to purge gas inlet 170.

Figure 2A:
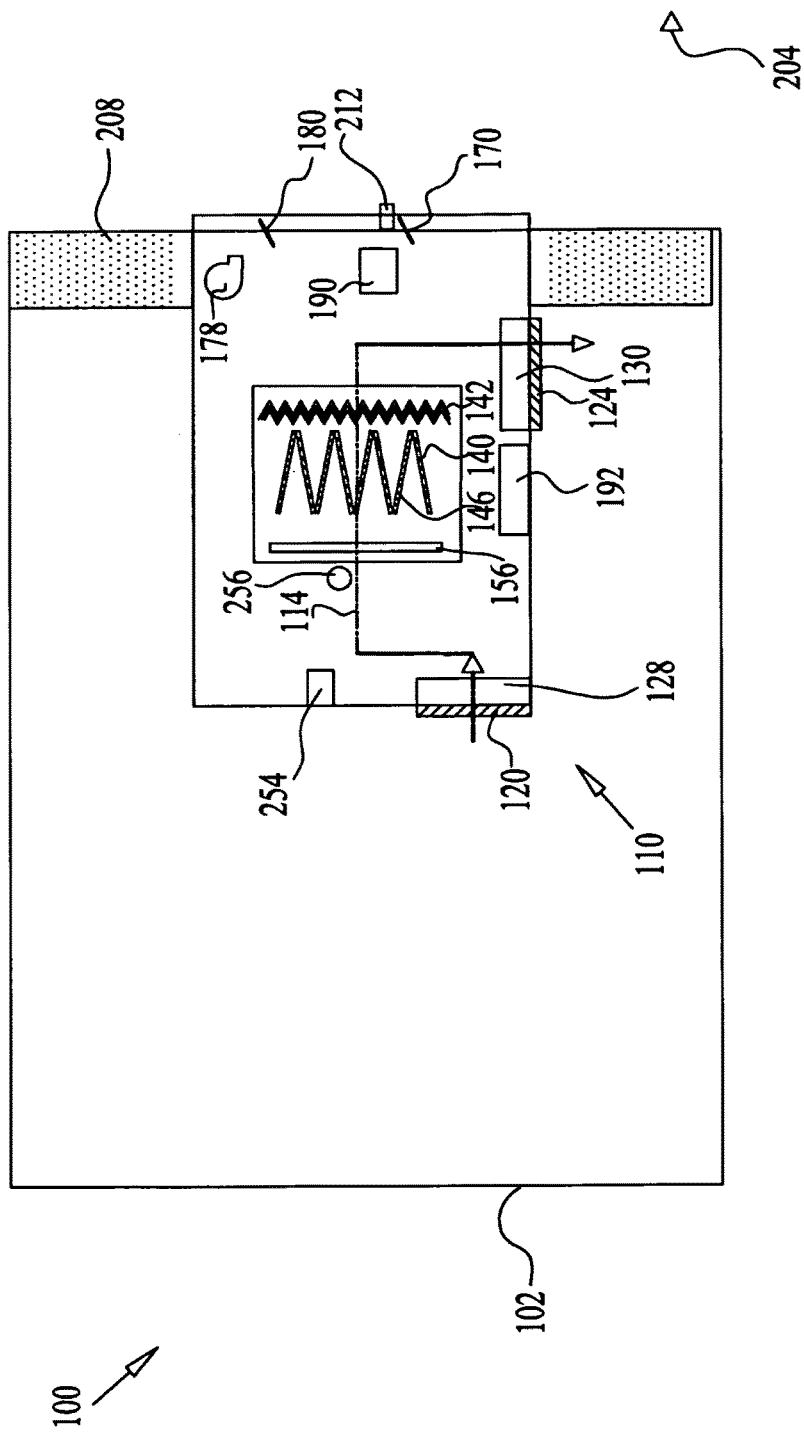
FIGS. 2A and 2B are simplified schematic illustrations of a system for reducing unwanted gases in indoor air at a first operational mode (FIG. 2A) and a second operational mode (FIG. 2B) according to some embodiments of the present disclosure.
Figure 2B:
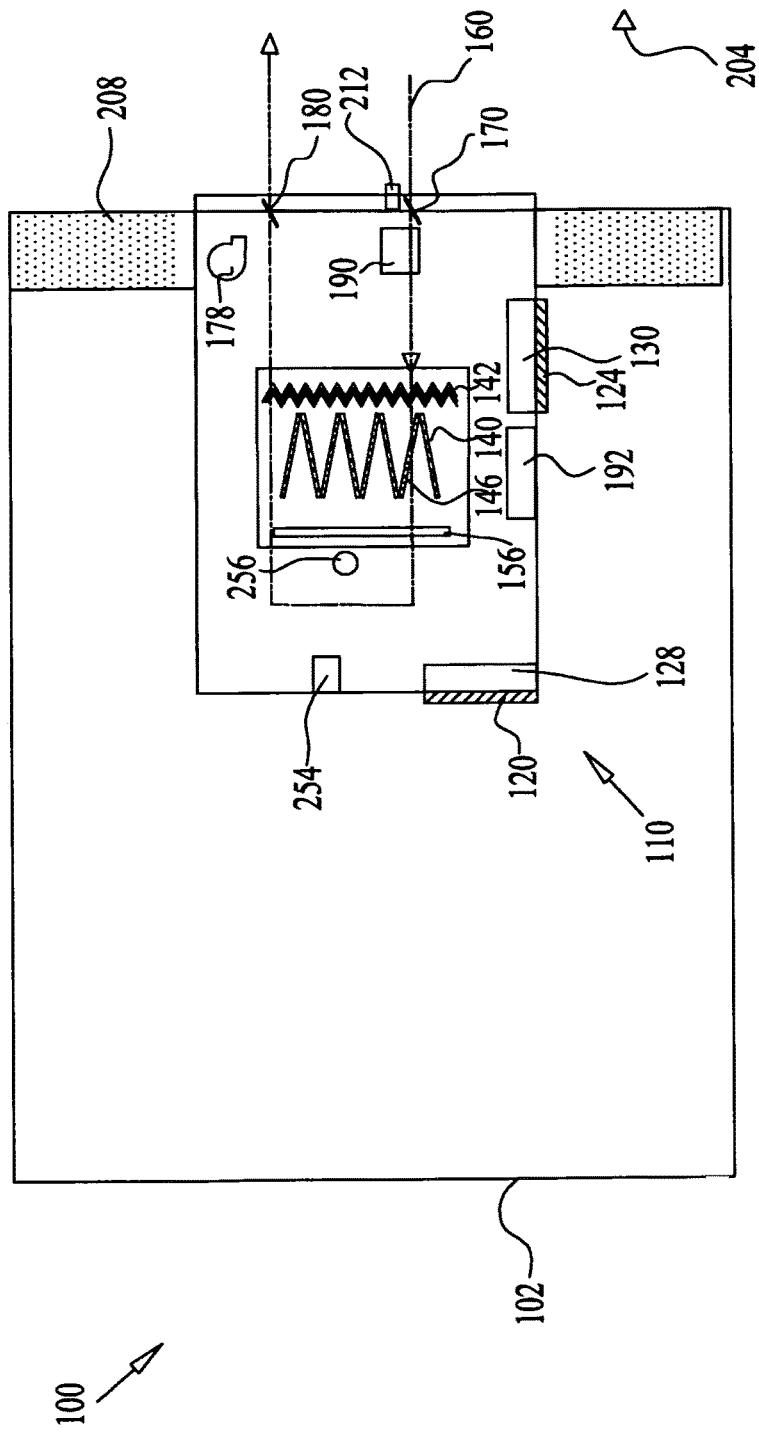

In some embodiments, purge gas inlet 170 and purge gas exhaust 180 may be formed as a conduit or duct, as shown in FIGS. 1A and 1B, or in any other suitable manner. In other embodiments, the purge gas inlet 170 and purge gas exhaust 180 may be formed as apertures allowing the purge gas 160 to flow therethrough, as shown in FIGS. 2A and 2B.

In some embodiments, the purge gas 160 exiting the purge gas exhaust 180 may be discharged into the ambient environment outside the enclosed environment 102. In some embodiments, the purge gas 160 may flow out of the purge gas exhaust 180 to existing exhaust ducts in the enclosed environment 102, such as an air exhaust, typically furnished in a bathroom of the enclosed environment 102 or openings such as windows. Additionally, purge gas 160 exiting the purge gas exhaust 180 may flow to a volume in the enclosed environment 102, such as a stairwell, sewerage system or smoke control system. Moreover, purge gas 160 may be directed to flow into a pressure vessel (not shown) for eventual release of the purge gas 160 therefrom.

The purge gas 160 may be heated prior to regeneration of the air treatment assembly 110 by any suitable heating element 190. The heating element 190 may comprise, for example, a coil such as an electrical coil, a radiator, a heat pump, a solar heater or an appropriately sized furnace burning water, gas or other fuel (not shown) for heating the purge gas 160. In some embodiments, the purge gas 160 may be heated within the air treatment assembly 110. In some embodiments, the purge gas 160 may be heated prior to flow into the air treatment assembly 110.

In accordance with some embodiments, the purge gas 160 may be heated to a temperature within a range of about 20-120° C. In accordance with some embodiments, the purge gas 160 may be heated to a temperature of less than 80° C. In accordance with some embodiments, the purge gas 160 may be heated to a temperature of less than 50° C. In accordance with some embodiments, the purge gas 160 may enter the air treatment assembly 110 at the ambient temperature of the ambient environment outside the enclosed environment 102.

Regeneration of the adsorbent material removes the contaminants from the adsorbent material. Therefore, the air treatment assembly 110 can be repeatedly used for removing contaminants from the enclosed environment 102 without requiring replacement of the adsorbent material. Accordingly, the air treatment assembly 110 has a significantly long operating life. In a non-limiting example, the $CO_2$ scrubbing cartridges 146 and/or VOC scrubbing cartridges 148 may operate for about a year, two years or three years, due to the regenerability thereof by the purge gas 160. In a non-limiting example, the air treatment assembly 110 may operate for 10-20 years. If necessary, the $CO_2$ scrubbing cartridges 146 and/or VOC scrubbing cartridges 148 may be replaced as will be further described.

In some embodiments after the significantly long operating life, the adsorbent materials may chemically or physically deteriorate. Accordingly, the $CO_2$ scrubbing cartridges 146 or VOC scrubbing cartridges 148 may be configured to be removable from the air treatment assembly 110. The removed scrubbing cartridges may be restored or replaced with operating scrubbing cartridges and may be returned to the air treatment assembly 110. The housing 112 may comprise access doors 192 allowing easy accessibility to any one of the $CO_2$ scrubbing cartridges 146 or VOC scrubbing cartridges 148. The access doors 192 may be placed at any suitable location within the housing 112.

The air treatment assembly 110 may be placed in any suitable location within the enclosed environment 102. In accordance with some embodiments of the present disclosure, the air treatment assembly 110 may treat the indoor air 114 independently of an air conditioning system. Accordingly, the air treatment assembly 110 may be located within the enclosed environment 102 at any convenient location wherein there is access to purge gas 160. Some exemplary locations for placement of the air treatment assembly 110 within the enclosed environment 102 are shown in FIGS. 1A-8.

As seen in FIGS. 1A and 1B, the air treatment assembly 110 may be mounted under a ceiling 200 within the enclosed environment 102 and may be affixed thereto by any suitable means.

The purge gas inlet 170 and purge gas exhaust 180 may be formed in any suitable manner for allowing the purge gas 160, such as outdoor air, to flow in to purge gas inlet 170 and out of purge gas exhaust 180. The access to outdoor air may be by any suitable means, such as by providing conduits, such as flexible conduits, in contact with a source of outdoor air in the ambient environment 204. In some embodiments, the contact with the source of outdoor air may be provided by utilizing outdoor air accesses existing in the enclosed environment 102, such as a window 206. In some embodiments, purge outdoor air access may be from a vent, or an enclosed environment pier. In some embodiments, the purge gas exhaust 180 may expel the purge gas 160 (i.e. the purge air) from the air treatment assembly 110, via window 206 as shown in FIG. 1B, and thereout into the ambient environment 204. In some embodiments, the purge gas 160 may be expelled from the air treatment assembly 110 to a bathroom in the enclosed environment, or any other location and thereout into the ambient environment 204.

In FIGS. 2A and 2B the air treatment assembly 110 is shown mounted to a wall 208 of the enclosed environment 102, wherein a portion of the air treatment assembly 110 may be placed in the enclosed environment 102 and a portion may protrude into the ambient environment 204. In some embodiments the wall 208 may be an exterior wall where one side of the wall is in the enclosed environment 102 and the other side of the wall is in the ambient environment 204. As seen in FIG. 2A, during the adsorption cycle, the indoor air 114 may enter the air treatment assembly 110 via the indoor air inlet 120 and damper 128, and may flow through filter 156, $CO_2$ sorbent section 140 and/or the VOC sorbent section 142 and out the air treatment assembly 110, via indoor air outlet 124 and damper 130 back into the enclosed environment 102.

As seen in FIG. 2B, during the regeneration cycle, the regenerating outdoor air of the purge gas 160 may enter the air treatment assembly 110 from the ambient environment 204, via purge gas inlet 170, and may be heated by the heating element 190. The purge gas 160 may flow through VOC sorbent section 142, the $CO_2$ sorbent section 140, and/or filter 156 for contaminant removal therefrom. The purge gas 160 exits the air treatment assembly 110, via purge gas exhaust 180, to the ambient environment 204. A damper set 212 may be provided, similar to dampers 176 and 182 in FIG. 1B.

As seen in FIGS. 2A and 2B, the air treatment assembly 110 may be mounted to wall 208 within the enclosed environment 102 and may be affixed thereto by any suitable means.

The purge gas inlet 170 and purge gas exhaust 180 may be formed in any suitable manner for allowing the purge gas, such as outdoor air, to flow into purge gas inlet 170 and out of purge gas exhaust 180. As seen in FIGS. 2A and 2B, the air treatment assembly 110 is partially placed in the ambient environment 204 and therefore there is easy access to regenerating outdoor air which can readily enter the purge gas inlet 170 and exit the purge gas exhaust 180.

Figure 3A:
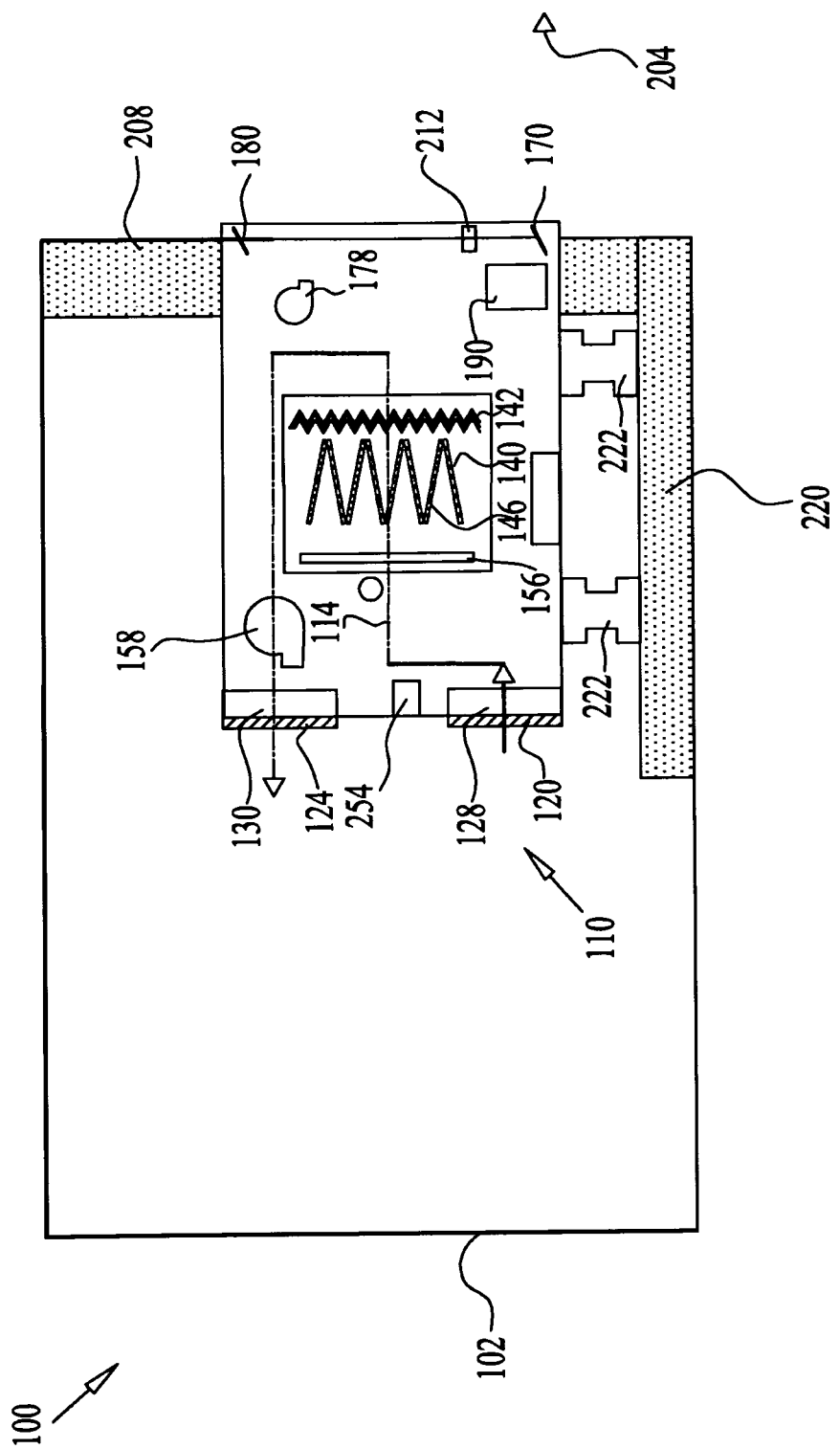
FIGS. 3A and 3B are simplified schematic illustrations of a system for reducing unwanted gases in indoor air at a first operational mode (FIG. 3A) and a second operational mode (FIG. 3B) according to some embodiments of the present disclosure.
Figure 3B:
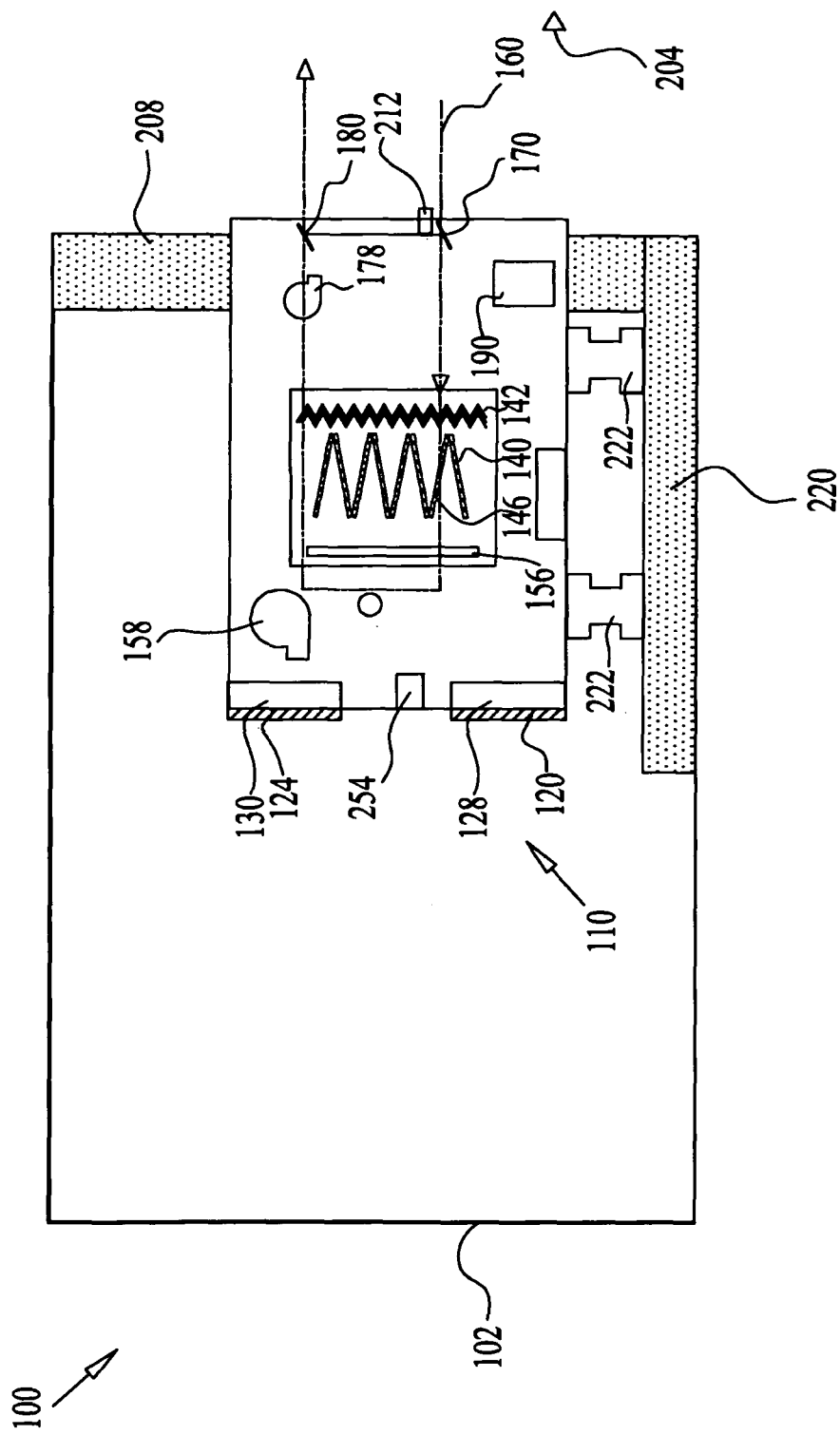

In FIGS. 3A and 3B the air treatment assembly 110 is shown mounted in proximity to a floor 220 or on the floor 220 of the enclosed environment 102, wherein the air treatment assembly 110 is placed in the enclosed environment 102. As seen in FIG. 3A, during the adsorption cycle, the indoor air 114 may enter the air treatment assembly 110 via indoor air inlet 120 and damper 128 and may flow through filter 156, $CO_2$ sorbent section 140 and/or the VOC sorbent section 142 and out the air treatment assembly 110 via indoor air outlet 124 back into the enclosed environment 102.

As seen in FIG. 3B, during the regeneration cycle, the outdoor air of the purge gas 160 enters the air treatment assembly 110 from the ambient 204, via purge gas inlet 170 and may be heated by heating element 190. A portion of the air treatment assembly 110 may protrude from wall 208 or any other location allowing outdoor air to flow therein. The purge gas 160 may flow through VOC sorbent section 142, the $CO_2$ sorbent section 140, and/or through filter 156 for contaminant removal therefrom. The purge gas 160 exits the air treatment assembly 110, via the purge gas exhaust 180 and damper set 212 to the ambient environment 204.

As seen in FIGS. 3A and 3B, the air treatment assembly 110 may be mounted in proximity to a floor 220 or on the floor 220 within the enclosed environment 102 and may be affixed to the floor 220 by any suitable means, such as via an attachment means 222 attaching the air treatment assembly 110 to the floor 220.

In some embodiments, the air treatment assembly 110 may be placed on the floor 220 distally from wall 208 and access to regenerating outdoor air 160 may be achieved in any suitable manner, such as via conduits placed at a window, for example.

Figure 4A:
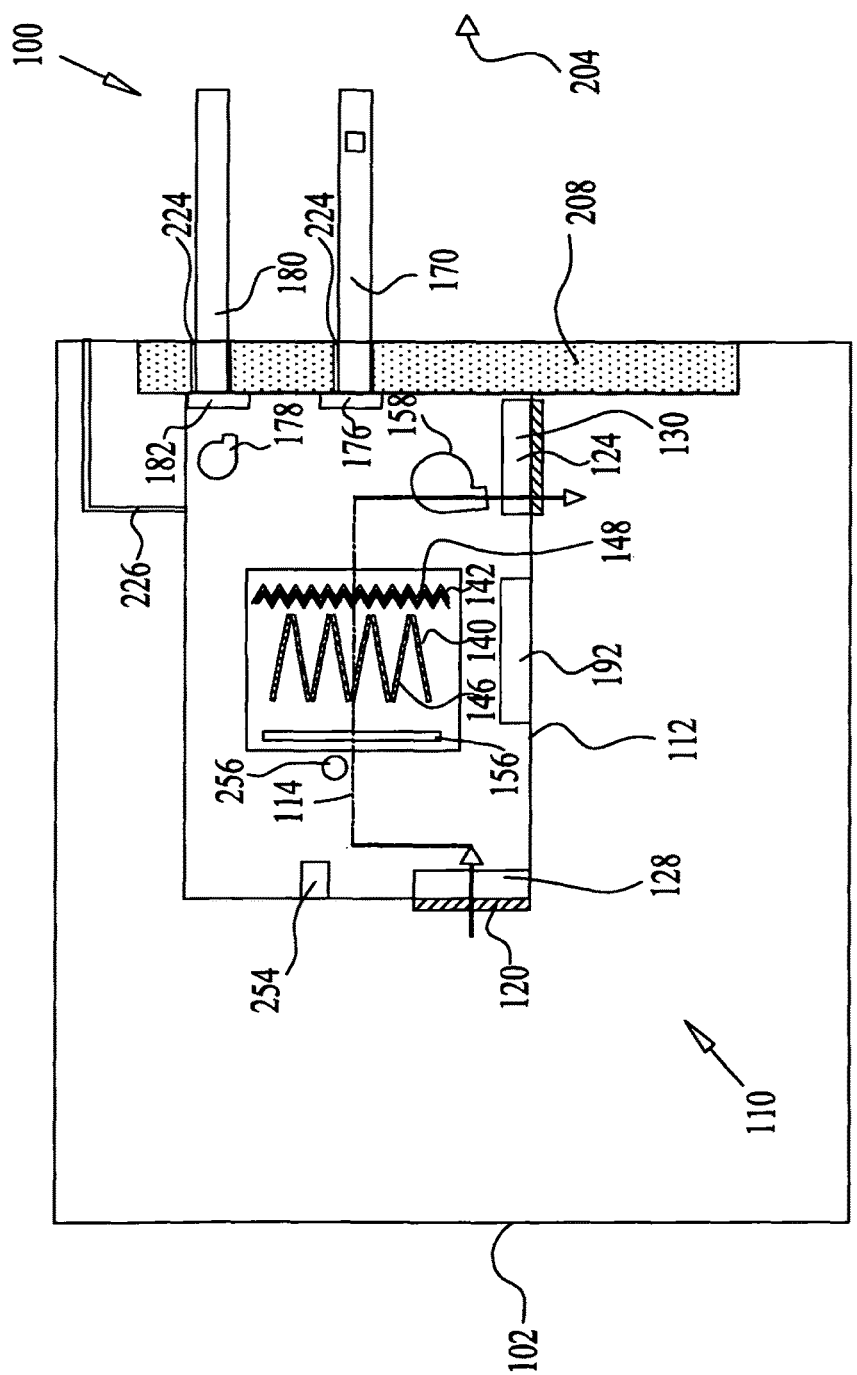
FIGS. 4A and 4B are simplified schematic illustrations of a system for reducing unwanted gases in indoor air at a first operational mode (FIG. 4A) and a second operational mode (FIG. 4B) according to some embodiments of the present disclosure.
Figure 4B:
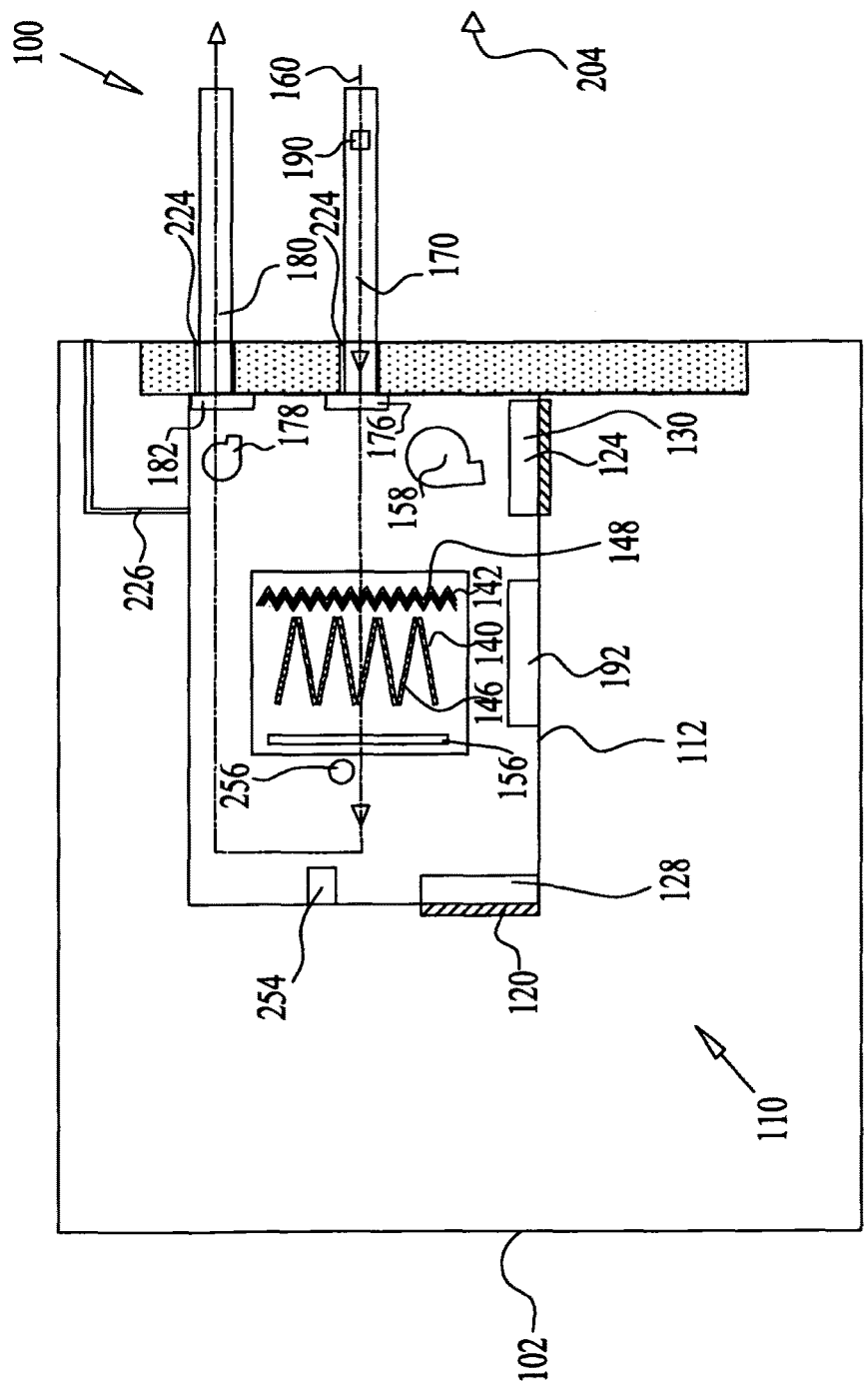

In FIGS. 4A and 4B the air treatment assembly 110 is shown mounted to the wall 208 of the enclosed environment 102 and may be at a distance from the floor 220 (FIG. 3A) or ceiling 200 (FIG. 1A). As seen in FIG. 4A, during the adsorption cycle, the indoor air 114 may enter the air treatment assembly 110 via the indoor air inlet 120 and damper 128 and may flow through filter 156, $CO_2$ sorbent section 140 and/or the VOC sorbent section 142 and out the air treatment assembly 110, via indoor air outlet 124 and damper 130 back into the enclosed environment 102.

As seen in FIG. 4B, during the regeneration cycle, the outdoor air of the purge gas 160 enters the air treatment assembly 110 from the ambient environment 204 via purge gas inlet 170 and damper 176 and may be heated by heating element 190, placed within purge gas inlet 170. The purge gas 160 may flow through VOC sorbent section 142, the $CO_2$ sorbent section 140, and/or filter 156 for contaminant removal therefrom. The purge gas 160 may exit the air treatment assembly 110, via the purge gas exhaust 180 and damper 182 to the ambient environment 204.

As seen in FIGS. 4A and 4B, the air treatment assembly 110 may be mounted to wall 208 at any location thereon within the enclosed environment 102 and may be affixed thereto by any suitable means, such as via an attachment means 226 attaching the air treatment assembly 110 to the wall 208.

The purge gas inlet 170 and purge gas exhaust 180 may be formed in any suitable manner for allowing the purge gas, such as outdoor air, to flow into purge gas inlet 170 and out of purge gas exhaust 180. As seen in FIGS. 4A and 4B, wall 208 may be formed with bores 224 for inserting the purge gas inlet 170 and purge gas exhaust 180 therethrough for allowing a portion of the purge gas inlet 170 and/or purge gas exhaust 180 easy access to regenerating outdoor air.

Figure 5A:
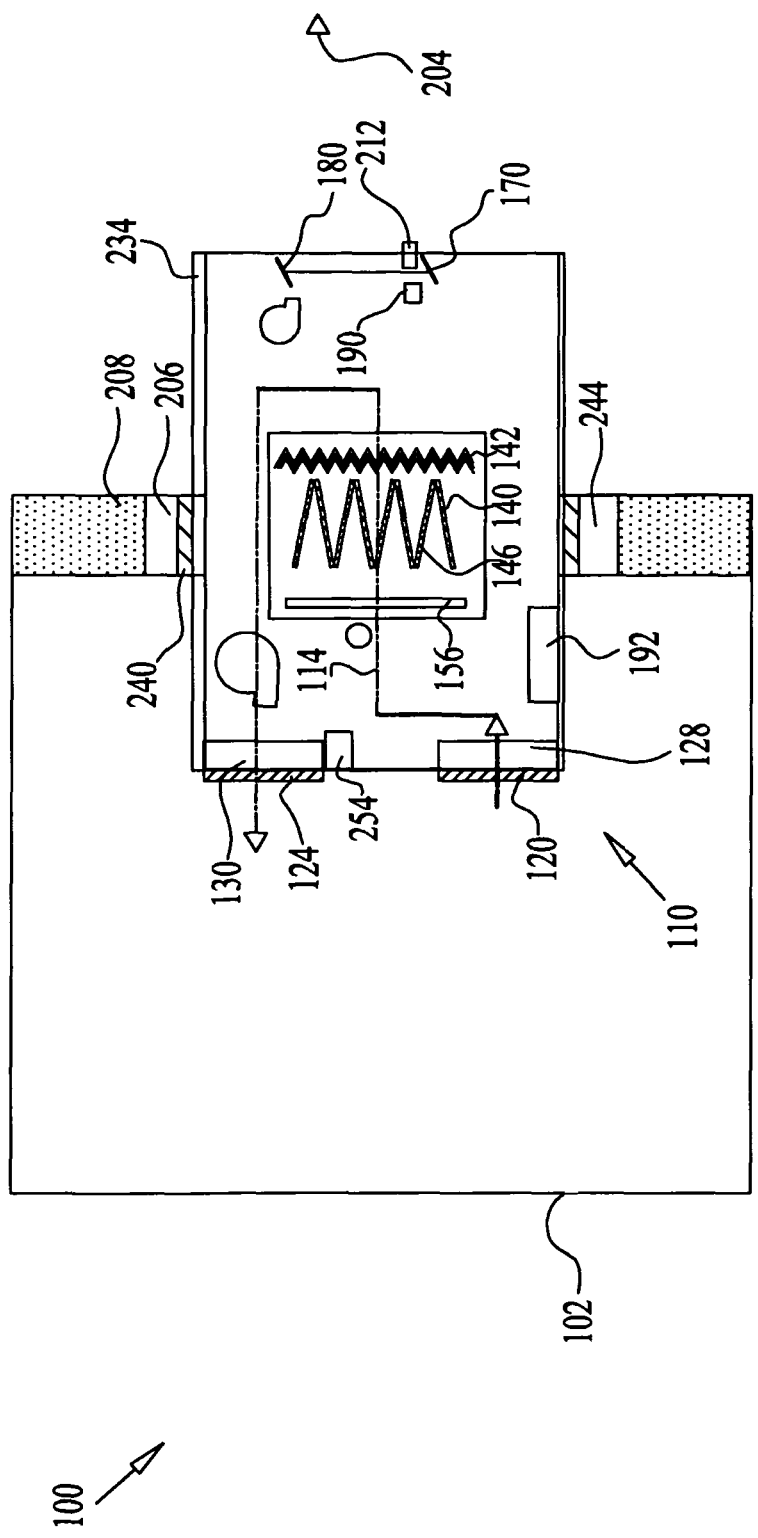
FIGS. 5A and 5B are simplified schematic illustrations of a system for reducing unwanted gases in indoor air at a first operational mode (FIG. 5A) and a second operational mode (FIG. 5B) according to some embodiments of the present disclosure.
Figure 5B:
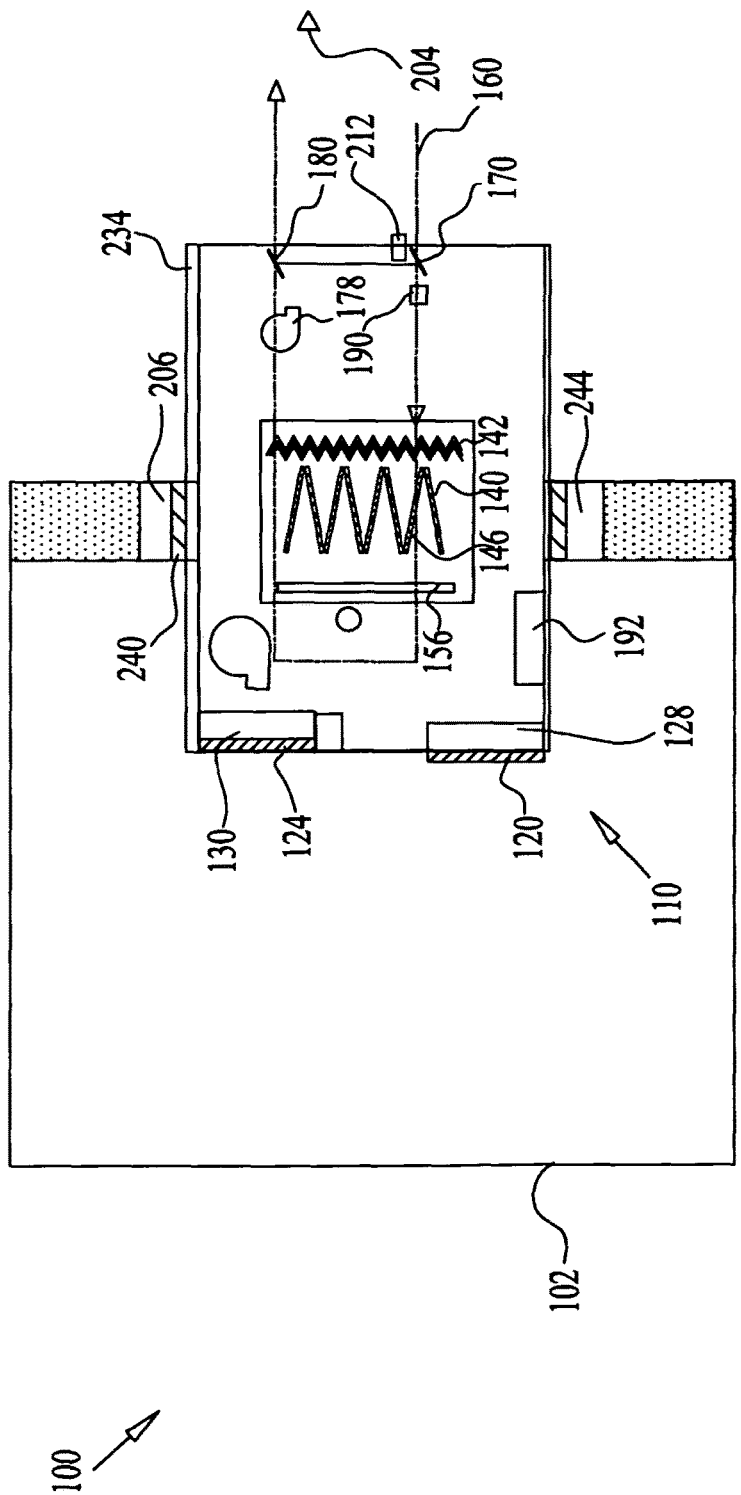

In FIGS. 5A and 5B the air treatment assembly 110 is shown mounted in window 206 of the enclosed environment 102, wherein a portion of the air treatment assembly 110 is placed in the enclosed environment 102 and a portion is placed in the ambient environment 204. As seen in FIG. 5A, during the adsorption cycle, the indoor air 114 may enter the air treatment assembly 110, via the indoor air inlet 120 and damper 128, and may flow through filter 156, $CO_2$ sorbent section 140 and/or the VOC sorbent section 142 and out the air treatment assembly 110, via indoor air outlet 124 and damper 130, back into the enclosed environment 102.

As seen in FIG. 5B, during the regeneration cycle, the outdoor air of the purge gas 160 enters the air treatment assembly 110 from the ambient 204, via purge gas inlet 170 and may be heated by the heating element 190. The purge gas 160 may flow through VOC sorbent section 142, the $CO_2$ sorbent section 140, and/or filter 156 for contaminant removal therefrom. The purge gas 160 may exit the air treatment assembly 110, via purge gas exhaust 180 and damper set 212 to the ambient environment 204.

The air treatment assembly 110 may be inserted within a casing 234. In some embodiments the casing 234 may be affixed to the window 230 and the air treatment assembly 110 may be removably inserted within the casing 234. Weather sealing strips 240 may be provided to seal the enclosed environment 102 from the ambient environment 204.

As seen in FIGS. 5A and 5B, the air treatment assembly 110 may be placed within window 206 and may be affixed thereto by any suitable means, such as via attachment means or by placing the air treatment assembly 110 on the window sill 244. In this embodiment the air treatment assembly 110 may be used to treat the indoor air 114 without altering any structural component of the enclosed environment 102. Accordingly, the air treatment assembly 110 may be placed by any laymen in the enclosed environment 102 without requiring any mechanical attachments or minimal mechanical attachments which are easily installable.

The purge gas inlet 170 and/or purge gas exhaust 180 may be formed in any suitable manner for allowing the purge gas 160, such as outdoor air, to flow into purge gas inlet 170 and out of purge gas exhaust 180. As seen in FIGS. 5A and 5B, the air treatment assembly 110 is partially placed in the ambient environment 204 and therefore there is easy access to regenerating outdoor air, which can readily enter the purge gas inlet 170 and exit the purge gas exhaust 180.

Figure 6:
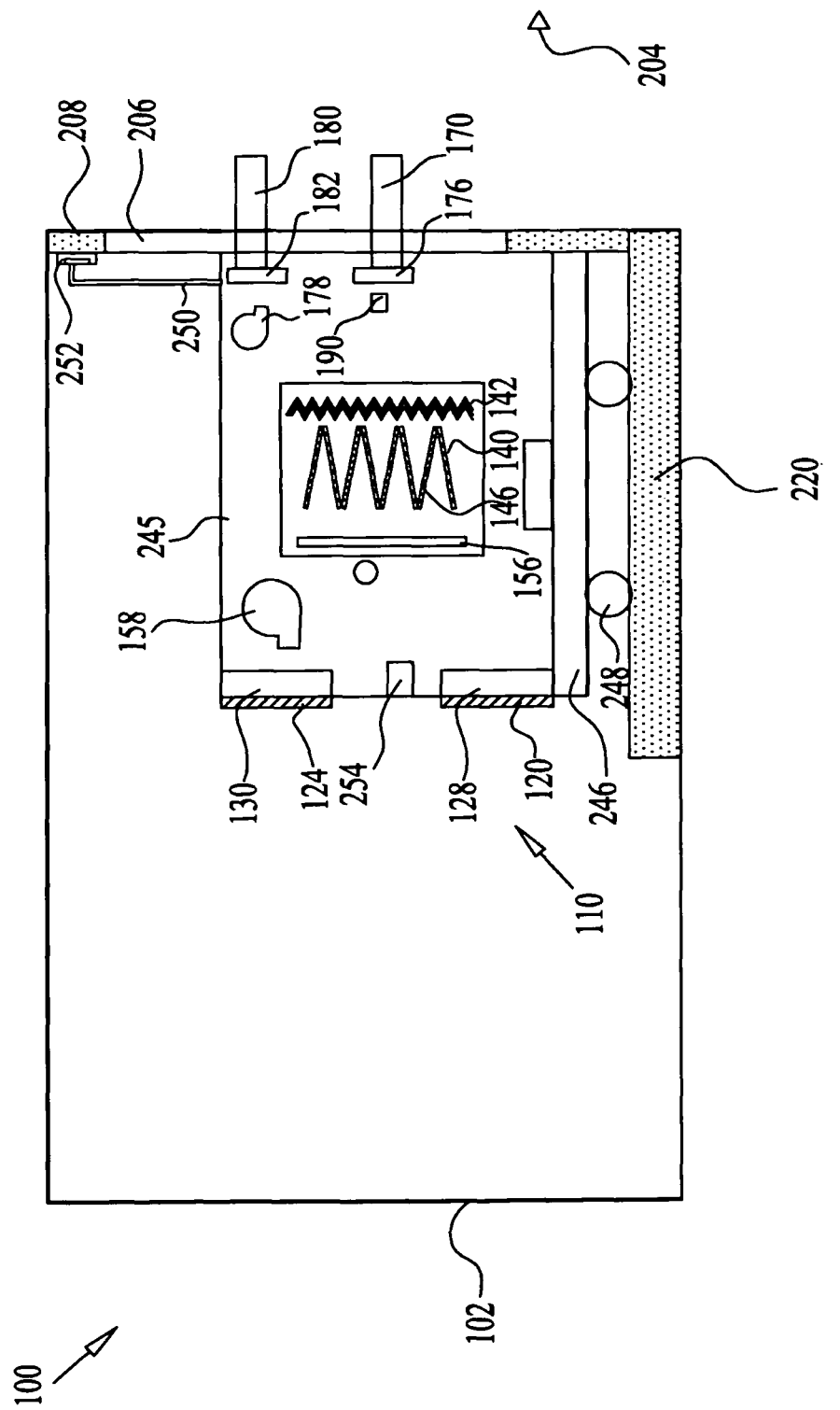
FIG. 6 is a simplified schematic illustration of a system for reducing unwanted gases in indoor air according to some embodiments of the present disclosure.

In some embodiments, the air treatment assembly 110 may be portable to facilitate changing its location with minimal installation work. Portability can be facilitated by any number of means. In some embodiments the air treatment assembly 110 may be configured as a portable unit with wheels or casters to roll easily over floors or surfaces and facilitate mobility. For example, as shown in FIG. 6, the air treatment assembly 110 may be configured as portable unit 245 placed on a portable base 246 with wheels 248. In some embodiments, the air treatment assembly 110 may be configured with an electric cord and plug or any other electrical connections 250 suitable for electrical communication with indoor electrical wall sockets 252. In some embodiments, the purge gas inlet 170 and/or purge gas exhaust 180 may be formed as flexible or collapsible conduits which may be extended towards a window, a plenum or any suitable exhaust area for exhausting the purge gas 160 exiting the air treatment assembly 110. The air treatment assembly 110 of FIG. 6 may operate as describe in any one of the embodiments of FIGS. 1A-5B.

Thus it is seen that according to some embodiments, the air treatment assembly 110 may be configured to be portable and configured with simple electrical connections adapted to easily connect to any standard electrical sockets and may be also configured for repeated use due to the regeneration of the adsorbent materials with outdoor air. The portability of the air treatment assembly 110 allows its use for a short duration or temporarily, (e.g. an evening, a few days, weeks or months) such as in enclosed environments 102 used for events or in venues. Additionally, the portability of the air treatment assembly 110 allows easy transfer of the air treatment assembly 110 from one enclosed space to another within the enclosed environment 102 or from one enclosed environment 102 to another enclosed environment 102.

Thus it is seen that in some embodiments, the air treatment assembly 110 may be configured to be easily installable in any enclosed environment 102 and configured with simple electrical connections adapted to easily connect to any standard electrical sockets and may be also configured for repeated use due to the regeneration of the adsorbent materials with outdoor air.

In some embodiments, the air treatment assembly 110 may be installed in enclosed environments 102 in addition to an existing air management system within the enclosed environment 102, yet independently from the air management system without any connection to the air management system.

In some embodiments, the air treatment assembly 110 may be configured to be installed in relatively small areas, such as classrooms of small offices, homes and buildings, for example, which are not large enough for large scale installations of air-conditioning systems and the ductworks which air-conditioning systems typically comprise.

Figure 7:
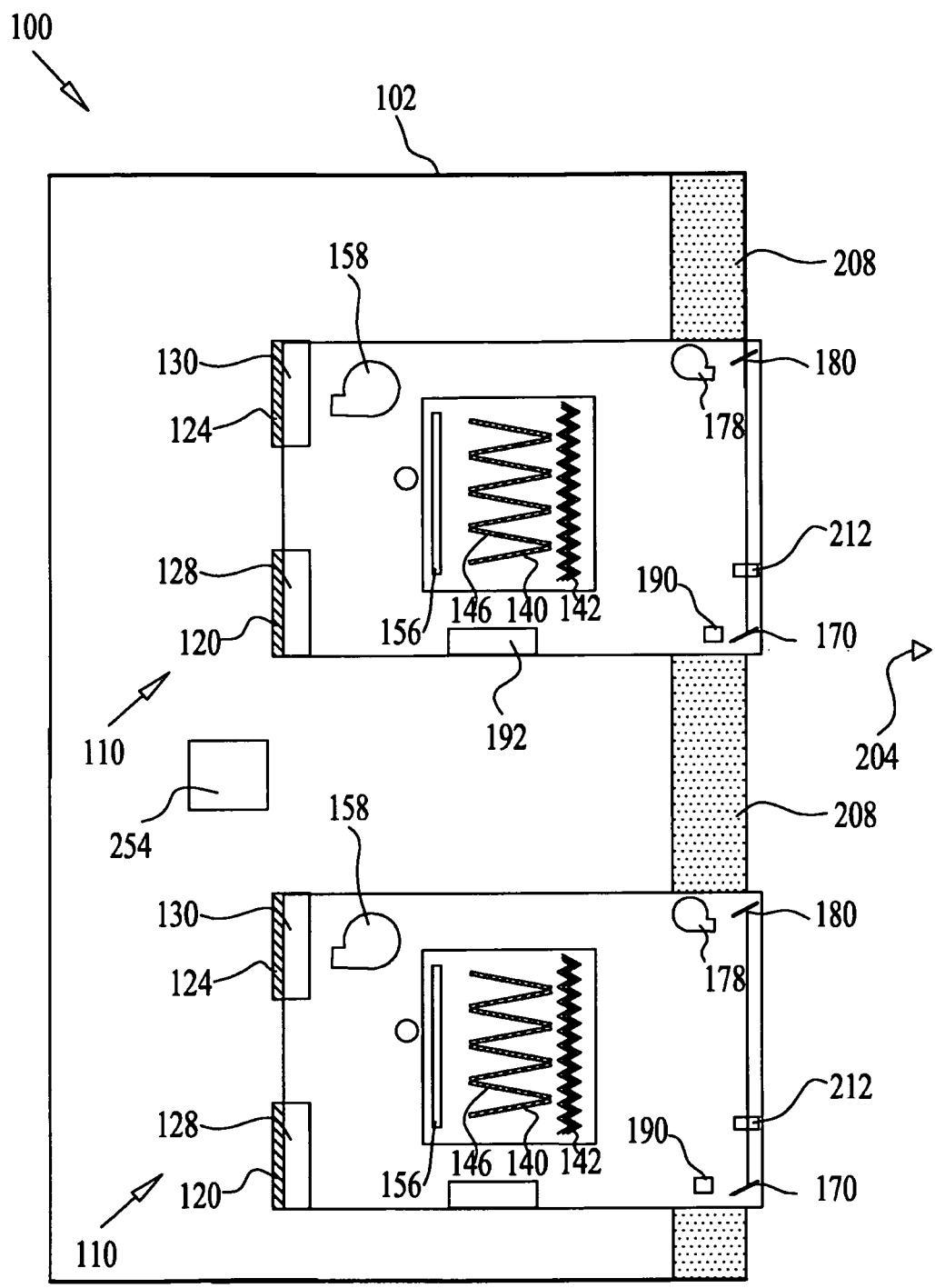
FIG. 7 is a simplified schematic illustration of a system for reducing unwanted gases in indoor air according to some embodiments of the present disclosure, respectively.

In some embodiments, the air treatment assembly 110 may be configured to be modular such that more than one air treatment assembly 110 may be inserted in the enclosed environment 102. The number of air treatment assemblies 110 may be determined according to the contamination level in the indoor air 114. In some embodiments, a plurality of air treatment assemblies 110 may be provided, as shown in FIG. 7, within the enclosed environment 102 and their operation may be selected according to the contamination level. For example, when the contamination level is high, all air treatment assemblies 110 may be operated and when the contamination level is lower, some of the air treatment assemblies 110 may discontinue their operation. A controller 254 may be provided to control the operation of the plurality of air treatment assemblies 110.

Figure 8:
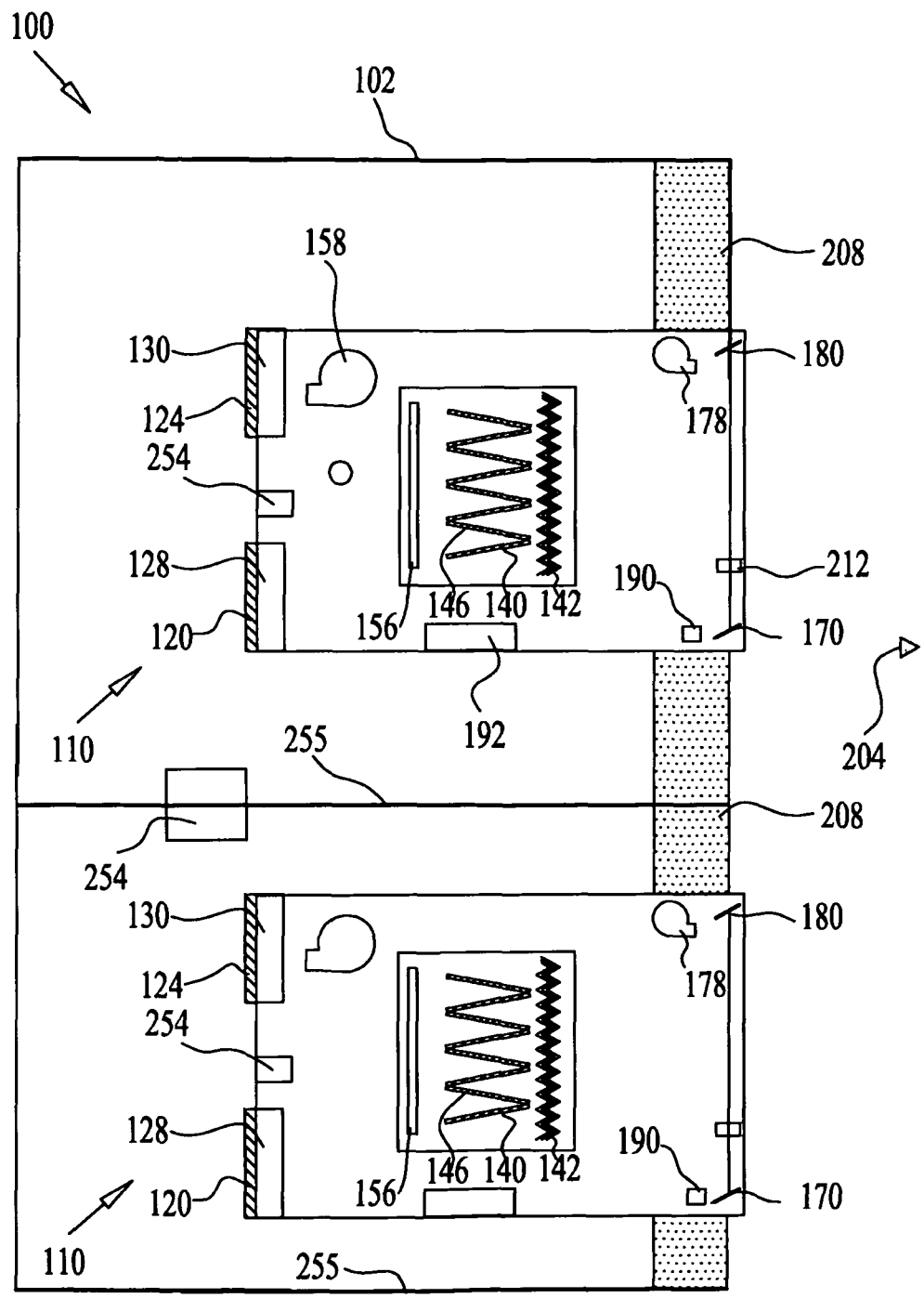
FIG. 8 is a simplified schematic illustration of a system for reducing unwanted gases in indoor air according to some embodiments of the present disclosure, respectively.

In some embodiments, controller 254 may be a central controller configured to control the operation of a plurality of air treatment assemblies 110, as shown in FIGS. 7 and 8. In some embodiments, controller 254 may be configured to control a single air treatment assembly 110, as shown in FIGS. 1A-6.

In some embodiments, the enclosed environment 102 may comprise a plurality of the indoor spaces 255 (e.g. rooms), as shown in FIG. 8, and a single or plurality of air treatment assemblies 110 may be provided. The central controller 254 may be provided to control the operation of the plurality of air treatment assemblies 110. The air treatment assembly 110 of FIGS. 7 and 8 may operate as describe in any one of the embodiments of FIGS. 1A-5B.

In some embodiments, the enclosed environment 102 may comprise a building with a single or plurality of rooms. The rooms may be human occupied. The air treatment assembly 110 may be partially placed within the volume of the room where the humans are present and partially placed in the ambient environment 204 out of the building, such as shown in FIGS. 2A-3B, 5A, 5B, 7 and 8. In some embodiments, the air treatment assembly 110 may be placed within the volume of the room where the humans are present and may comprise access to the ambient environment 204 out of the building, such as shown in FIGS. 1A, 1B, 4A, 4B and 6. The air treatment assembly 110 may be placed in any suitable location in the volume of the room, such mounted to the ceiling 200, wall 208, placed in proximity or on the floor 220, or in window 206, for example. The indoor air 114 within the room may flow directly, i.e. from the volume of the room, into the indoor air inlet 120 without first flowing through ducts or plenum. The treated air exiting the air treatment assembly 110 may be expelled back into the volume of the room for providing the human occupants therein with good quality air.

In some embodiments, the enclosed environment 102 lacks a controlled supply of ventilation outdoor air, such as a machine controlled supply of ventilation outdoor air. A machine controlled supply of ventilation outdoor air may comprise the air management system, as described above, wherein the control of fresh air for ventilation, originating from the ambient environment 204, is typically controlled, such as by mechanical components or electrical components. In the absence of such ventilation, indoor air quality is likely to deteriorate over time as gas contaminants build up and may not be removed effectively. The air treatment assembly 110 may be configured to remove at least the portion of the at least one gaseous contaminant from this enclosed environment 102, thereby providing good quality air where there is a lack of supply of ventilation outdoor air.

It is noted in reference to FIGS. 1A-8, that any other suitable means besides dampers, such as valves, fans, blowers, or shutters, may be used to control the volume of air entering and/or exiting the air treatment assembly 110 and any components may be used for directing the indoor air 114 into the air treatment assembly 110.

In some embodiments of the systems shown in FIGS. 1A-8, a single or plurality of sensors 256 may be provided to detect levels of one or more contaminants, substances, gases (such as $CO_2$ and other gases), fumes, vapors, (such as VOCs) and/or any combination thereof. The sensors 256 may be placed in any suitable location within the enclosed environment 102 or in proximity thereto. Upon detection of a particular concentration of such contaminants, substances, gases, etc., the sensor(s) 256 may be configured to generate output data that can be transmitted to the control system or controller 254 for processing thereof.

The controller 254 may be operative to control any one or more of: the duration of time the adsorption cycle and the regeneration cycle, the volume of air flowing into the air treatment assembly 110 for scrubbing thereof, the volume of purge gas flowing into the air treatment assembly 110 for regeneration of the adsorbent material, and switching of the air treatment assembly 110 from the adsorption cycle to the regeneration cycle and vice versa.

In some embodiments, the controller 254 may be designed to control the duration and air volume during the adsorption cycle and the regeneration cycle and switching of the air treatment assembly 110 from the adsorption cycle to the regeneration cycle and vice versa, according to a preset schedule, or by sensing a predetermined level of the contaminants by the sensors and accordingly operating the adsorption cycle or regeneration cycle, or by determining an occupancy level of the enclosed environment 102 and, accordingly, operating the adsorption cycle or regeneration cycle, for example. The duration or volume during the adsorption cycle or regeneration cycle and switching therebetween may be controlled by a manual trigger or by externally signaled commands or any other suitable means.

In some embodiments, the controller 254 (i.e. a controller system) may be provided for controlling at least the cyclic operation of the adsorption mode and the regeneration mode by controlling the at least one airflow element.

In some embodiments, the controller 254 may be designed to activate the air treatment assembly 110 in response to actual contaminant levels, occupancy, or preset schedules.

In some embodiments the controller 254 may be an electrical control system.

According to some embodiments, the air treatment assembly 110 of the present disclosure is configured to scrub contaminants from indoor air in an enclosed environment 102 which may have insufficient air ventilation means, such as inadequate access to ventilation outdoor air for example. Scrubbing the contaminates from the indoor air 114 of an insufficiently ventilated enclosed environment 102 provides for good air quality. The air treatment assembly 110 may comprise access to regenerating outdoor air for regenerating the adsorbent material. Since the regenerating outdoor air is provided for regenerating the adsorbent material, a relatively small volume of regenerating outdoor air may be required, less than required for sufficient ventilation of the enclosed environment 102, and access to regenerating outdoor air may be limited to the regeneration cycle time period. Therefore the air treatment assembly 110 is configured to scrub contaminants from indoor air in the enclosed environment, which may have inadequate access to ventilation outdoor air.

In some embodiments, the enclosed environment 102 may contain air ventilation means yet due to relatively high human density therein the standard air ventilation may be insufficient and thus the amount of indoor contaminants may not be adequately managed by standard ventilation. In a non-limiting example, a classroom with high student density may have higher than acceptable levels of $CO_2$ constituting good air quality. Scrubbing the contaminates from the indoor air 114 of an insufficiently ventilated enclosed environment 102 provides for good air quality.

In some embodiments, the enclosed environment 102 may comprise sufficient means for standard, outside air ventilation for maintaining good air quality, yet reducing the contaminates in the indoor air 114 within the air treatment assembly 110 allows reducing the volume of fresh, outdoor air which is required for maintaining good air quality within the enclosed environment 102. Accordingly, the energy required to condition (i.e. change the temperature and/or humidity level) the outdoor air is reduced.

In some embodiments, in an enclosed environment 102 wherein the indoor air 114 is conditioned by radiation and/or other heating (or cooling) methods, it is desired to minimize the introduction of ventilating outdoor air, which would require much energy for conditioning the ventilating outdoor air. In a non-limiting example, wherein the enclosed environment 102 is in a cold climate and heating of the indoor air 114 is performed by a radiation heater, a furnace, a gas heater or any other suitable heating system, it is preferable to minimize introduction of outdoor air for ventilation. In accordance with the present disclosure, scrubbing the contaminants within the air treatment assembly 110 ensures the good quality of the indoor air is maintained while minimal or no volume of ventilating outdoor air is required.

In some embodiments, reducing the content of contaminants present in the enclosed environment 102 by scrubbing within the air treatment assembly 110 is more desirable than outside air ventilation for avoiding or minimizing introduction of potential pollutants and contaminants from the outdoor air into the enclosed environment 102.

Various implementations of some of embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the controller 254, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to trans location control. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Also within the scope of some of the embodiments of the present disclosure is the specific lack of one or more features that may be present in the prior art. In such embodiments, patentable claims may include negative limitation to indicate such lack of one or more features taught in the prior art in, for example, any one or more of certain disclosed apparatuses, systems, and methods.

What is claimed is:

1. An air treatment system for limiting a concentration of at least one gaseous contaminant contained in indoor air of an enclosed environment below a predetermined concentration, the system comprising an air treatment assembly having:
   an indoor air inlet configured to receive at least a portion of an indoor airflow directly from an enclosed environment without aid from a duct or conduit;
   a regenerable adsorbent material configured to adsorb at least one gaseous contaminant contained in the portion of the indoor airflow;
   an airflow element for directing the portion of the indoor airflow from the enclosed environment to the air treatment assembly;
   an indoor air outlet for expelling the portion of indoor airflow treated by the adsorbent material from the air treatment assembly for flow back directly into the enclosed environment without aid from a duct or conduit;
   a purge air inlet configured to receive and direct purge air over and/or through the adsorbent material for removal of at least a portion of the at least one gaseous contaminant adsorbed by the adsorbent material; and
   a purge air outlet for expelling the purge air out of the air treatment assembly,
   wherein the air treatment assembly is configured to limit the gaseous contaminant concentration of the indoor air below a predetermined concentration according to any and all of the following configurations:
      upon outdoor air ventilation of the enclosed environment being insufficient for maintaining the least one gaseous contaminant concentration below the predetermined concentration;
      the indoor air being conditioned by an air conditioning system independent from the air treatment assembly, the conditioning comprising changing at least one of the temperature and humidity of the indoor air, the air conditioning system comprising components for circulating the indoor air; or
      the indoor air is not conditioned by an air conditioning system.

2. An air treatment system according to claim 1, wherein the gaseous contaminant is carbon dioxide and the predetermined concentration contained in indoor air is about 2000 ppm.

3. An air treatment system according to claim 1, wherein the gaseous contaminant is carbon dioxide and the insufficiency of outdoor air ventilation occurs upon the enclosed environment containing a human density effecting a carbon dioxide concentration in the indoor air above about 2000 ppm.

4. An air treatment system according to claim 1, further comprising a controller system configured to control operation of the air treatment assembly.

5. An air treatment system according to claim 4, further comprising one or more sensors for measuring the concentration of the at least one gaseous contaminant and/or detecting a presence of the at least one gaseous contaminant, wherein the one or more sensors are configured to:
   generate a signal corresponding to the concentration of the at least one gaseous contaminant and/or the presence of the at least one gaseous contaminant, and
   transmit the signal to the controller system.

6. An air treatment system according to claim 1, wherein the airflow element comprises at least one of a fan, a blower, a damper, and a shutter.

7. An air treatment system according to claim 1, wherein the air treatment assembly is configured as a portable unit.

8. An air treatment system according to claim 1, wherein the air treatment assembly includes one or more wheels and/or castors for transporting the air treatment assembly.

9. An air treatment system according to claim 1, wherein the air treatment assembly is configured for installation in a window or an exterior wall of the enclosed environment.

10. An air treatment system according to claim 1, wherein the air treatment assembly is configured for placement on or proximate a floor of the enclosed environment.

11. An air treatment system according to claim 1, further comprising one or more flexible or collapsible conduits configured to:
direct purge air to the air treatment assembly to flow over and/or through the adsorbent material; and/or
expel purge air from the air treatment assembly via the purge air outlet to outside the enclosed environment.

12. An air treatment system according to claim 1, wherein the purge air is directly or indirectly heated by at least one of a heat pump, a furnace, solar heat, an electrical coil, and hot water.

13. An air treatment system according to claim 1, wherein the at least one gaseous contaminant is selected from the group consisting of: carbon dioxide, volatile organic compounds, sulfur oxides, radon, nitrous oxides and carbon monoxide.

14. An air treatment system according to claim 1, wherein the adsorbent material comprises at least one of: activated carbon, carbon particles, solid supported amine, molecular sieves, porous silica, porous alumina, carbon fibers, metal organic frameworks, porous polymers and polymer fibers.

15. An air treatment system according to claim 1, further comprising at least one cartridge wherein the adsorbent material is arranged therein, wherein the air treatment assembly is configured to provide access to the cartridge while the air treatment assembly remains stationary.

16. An air treatment system according to claim 1, wherein the removal of the at least one gaseous contaminant adsorbed by the adsorbent material regenerates the adsorbent material and is performed in-situ the adsorbent material without removing the adsorbent material from the air treatment system.

17. A method for limiting a concentration of at least one gaseous contaminant contained in indoor air of an enclosed environment below a predetermined concentration, the method comprising:
receiving indoor airflow directly from an enclosed environment through an indoor air inlet without aid from a duct or conduit;
directing the indoor airflow by at least one airflow element to flow through a regenerable adsorbent material;
adsorbing at least one gaseous contaminant contained in the indoor airflow by the regenerable adsorbent material;
expelling the indoor airflow, treated by the adsorbent material back directly into the enclosed environment without aid from a duct or conduit;
receiving and directing purge air over and/or through the adsorbent material for removal of at least a portion of the at least one gaseous contaminant adsorbed by the adsorbent material; and
expelling the purge air out of the adsorbent material; wherein the method for limiting a concentration of at least one gaseous contaminant contained in indoor air of an enclosed environment below a predetermined concentration is configured according to any and all of the following configurations:
upon outdoor air ventilation of the enclosed environment being insufficient for maintaining the least one gaseous contaminant concentration below the predetermined concentration;
the indoor air being conditioned by an air conditioning system independent from the air treatment assembly, the conditioning comprising changing at least one of the temperature and humidity of the indoor air, the air conditioning system comprising components for circulating the indoor air; or
the indoor air is not conditioned by an air conditioning system.

18. A method according to claim 17, further comprising controlling operation of the limiting of the concentration of at least one gaseous contaminant contained in indoor air by a controlling system.

19. A method according to claim 18, further comprising measuring a concentration of the at least one gaseous contaminant and/or detecting the presence of the at least one gaseous contaminant via one or more sensors, wherein the one or more sensors are configured to:
generate a signal corresponding to the concentration of the at least one gaseous contaminant and/or the presence of the at least one gaseous contaminant, and
transmit the signal to the controller system.

20. A method according to claim 17, wherein the at least one gaseous contaminant is selected from the group consisting of: carbon dioxide, volatile organic compounds, sulfur oxides, radon, nitrous oxides and carbon monoxide.

* * * * *